United States Patent [19]
Olson et al.

[11] Patent Number: 5,895,332
[45] Date of Patent: Apr. 20, 1999

[54] CHAIN TENSIONING APPARATUS FOR A PACKAGING MACHINE

[75] Inventors: Allen L. Olson, Crosby; Gerald J. Geisenhof, Ft. Ripley, both of Minn.

[73] Assignee: Riverwood International Corporation, Atlanta, Ga.

[21] Appl. No.: 08/864,502

[22] Filed: May 29, 1997

Related U.S. Application Data

[60] Provisional application No. 60/018,786, May 31, 1996.

[51] Int. Cl.⁶ ............................................. F16H 7/14
[52] U.S. Cl. .................. 474/113; 474/101; 474/110; 474/136; 198/813; 74/128
[58] Field of Search ............................ 474/101, 103, 474/104, 105, 110, 136, 114, 113; 198/813, 814; 74/128, 126, 141.5, 142; 248/657, 658; 340/686, 668, 676

[56] References Cited

U.S. PATENT DOCUMENTS

| | | | |
|---|---|---|---|
| 2,472,461 | 6/1949 | Blackburn | 474/136 |
| 2,575,313 | 11/1951 | Covert et al. | 474/110 |
| 2,725,976 | 12/1955 | Madeira | 198/813 X |
| 2,858,936 | 11/1958 | Ogden | 198/810.04 |
| 2,907,450 | 10/1959 | Reid | 198/810.04 |
| 3,015,473 | 1/1962 | Frellsen | 254/268 |
| 3,921,793 | 11/1975 | Hutchinson | 198/813 X |
| 4,007,827 | 2/1977 | Mattos | 198/813 X |
| 4,454,236 | 6/1984 | Foster et al. | 474/110 X |
| 4,803,804 | 2/1989 | Bryant | 474/113 |
| 4,881,929 | 11/1989 | Randles | 474/111 |
| 5,026,326 | 6/1991 | Pollich et al. | 474/134 |
| 5,797,481 | 8/1998 | Uber et al. | 198/813 X |

Primary Examiner—Charles A. Marmor
Assistant Examiner—Ankur Parekh
Attorney, Agent, or Firm—Skinner and Associates; Steve McLary

[57] ABSTRACT

A tensioning system for an endless chain comprising a snail cam mounted on a second shaft parallel to a sprocket shaft which supports a sprocket and chain, a follower running against the snail cam and mounted on a mechanism supporting the sprocket shaft, a ratchet device which selectively limits the rotational direction of the second shaft so that the radius of the snail cam at the follower increases with rotation, a means of applying a controlled rotational force to the second shaft to advance the ratchet device if chain tension is below a predetermined level, but not advance it if chain tension is above a predetermined level.

23 Claims, 7 Drawing Sheets

CHAIN TENSIONING APPARATUS FOR A PACKAGING MACHINE

CROSS-REFERENCE TO RELATED APPLICATIONS

This application claims the benefit, under 35 U.S.C. 119(e), of U.S. provisional application Serial No. 60/018,786, filed May 31, 1996.

STATEMENT REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention

The present invention relates, generally, to chain-utilizing machinery. More particularly, the invention relates to automated packaging machinery which utilize chains in drive conveyors and other assemblies or mechanisms thereof. However, the invention also may be found to have utility in other applications.

2. Background Information

Endless means such as chains, belts, cables and ropes have many uses on machinery. For example, torque is transferred from one rotating element to another through endless means running on shafts, pulleys or sprockets. Processing conveyors often are driven by endless means and may have conveyor elements attached to the endless means. Endless means stretch with use over time, and proper tension must be maintained in the endless means for the machinery to properly operate. The invention is described with respect to a chain, specifically a chain-driven conveyor, but the invention is applicable to tensioning other endless means.

One type of machine which commonly uses chain driven conveyors is a packaging machine. In a typical packaging machine for placing groups of articles, such as bottles or cans, within individual cartons, the cartons are in a collapsed form, called a blank, at one end of the packaging machine. Articles to be packaged are also fed in mass into one end of the machine. The machine opens a carton blank, groups and positions articles to be placed in the carton; brings the group of articles and carton together; then closes and seals the carton, and dispenses it out the other end of the machine.

The continuous motion of all the articles, cartons, packaged articles and mechanisms of the packaging machine is synchronized by mechanical and electronic devices. One of the most common mechanical devices used is a continuous chain. A typical packaging machine will have a number of continuous chains each performing a different function, and each with different elements attached to it. Such elements include flight bars for separating articles into groups, conveyor members for moving articles, pop-up conveyor members for maintaining separation of grouped articles, lugs and carrier assemblies for moving cartons, and barrel cam cross loading mechanisms for pushing grouped articles into cartons. All of these chains must be maintained at the proper tension for the machine to properly function. As the machine is used over time, the pins and holes of the chain wear causing the chains to stretch and lose tension. Consequently, each chain must be periodically retensioned.

In the past, chain tensioning has been done manually using a wrench or lever turning a series of screws, shafts, or turnbuckles. The tension developed in the chain was subject to the skill of the person tensioning it, and often varied depending on the strength of the person making the adjustment and the size of the wrench used. Too high a tension creates unnecessary wear of the chain, and too low of a tension may allow too much movement of the chain and potential disaster if a chain were to come off a sprocket.

Despite the need in the art for a chain tensioning system which overcomes the disadvantages, shortcomings and limitations of the prior art, none insofar as is known has been developed. Accordingly, it is an object of the present invention to provide an improved chain tensioning system which more accurately controls the level of tension in a chain. It is a further object of this invention to provide a chain tensioning system which is less dependent on the skill of the person adjusting the tension to achieve the proper tension. It is a further object of this invention to provide a chain tensioning system which indicates when a chain has been stretched to its limit and prevents the machine from operating. It is a further object of this invention to provide a chain tensioning system which tensions a chain semi-automatically.

BRIEF SUMMARY OF THE INVENTION

The apparatus of the present invention provides a chain tensioning system for a chain used, for example, on a packaging machine wherein the chain tensioning system provides tension to the chain incrementally as controlled by a ratchet device. A controlled force, such as that applied by a pneumatic cylinder, is applied to the ratchet device periodically, such as at the start of each day. If the chain is loose enough to allow the controlled force to advance the ratchet device at least one step, then the ratchet advances and holds the chain at a higher tension level when the controlled force is removed. If the controlled force is insufficient to advance the ratchet device one step, then the ratchet device does not advance, and the ratchet device holds the chain at the previous tension level when the controlled force is removed. Tensioning the chain is thereby a semi-automatic operation requiring a machine operator to only activate a device which applies the controlled force. The system then sets proper tension in the chain.

The chain tensioning system includes a device, such as a pneumatic or hydraulic cylinder, for applying and releasing a controlled force which acts on a lever arm connected to a one-way clutch or bearing, which rotates a shaft connected to the input of the ratchet device. The one-way clutch or bearing allows the reciprocating linear motion of a device such as a pneumatic cylinder to drive the ratchet device in one rotational direction. The ratchet device may have gears or other mechanisms to ratio the out put of the device to the input. The rotational output of the ratchet device is attached to a snail cam on which rides a cam follower attached to a movable structure supporting the shaft and sprockets on which the chain travels. As the output of the ratchet device rotates the snail cam, the snail cam moves the cam follower which pushes the movable structure, typically on slide tracks, to tighten the chain. The tension imparted on the chain is dependent on the amount of controlled force imparted by the pneumatic cylinder and the size of the incremental force needed to advance the ratchet device.

The present invention also includes a safety device that prevents the chain from being stretched beyond its safe limit. A sensor such as a proximity sensor is positioned to detect a feature of the movable structure on which the sprockets are mounted. If the tensioning operation causes the chain to stretch beyond a defined limit, the feature will be with the sensing range of the sensor, and the sensor will then signal the machine controller and prevent the machine from operating.

The features, benefits and objects of this invention will become clear to those skilled in the art by reference to the following description, claims and drawings.

DETAILED DESCRIPTION

Industrial process equipment often operates using endless chains to drive conveyors or other mechanisms for processing items. The present invention provides a mechanism for tensioning endless chains on such equipment in an easy, repeatable, reliable manner. While the chain tensioner of the present invention is described in relation to a packaging machine for beverage containers, the invention is applicable to any process equipment using an endless chain. The invention is also applicable to tension belts or other endless devices on machines.

Figure 1:
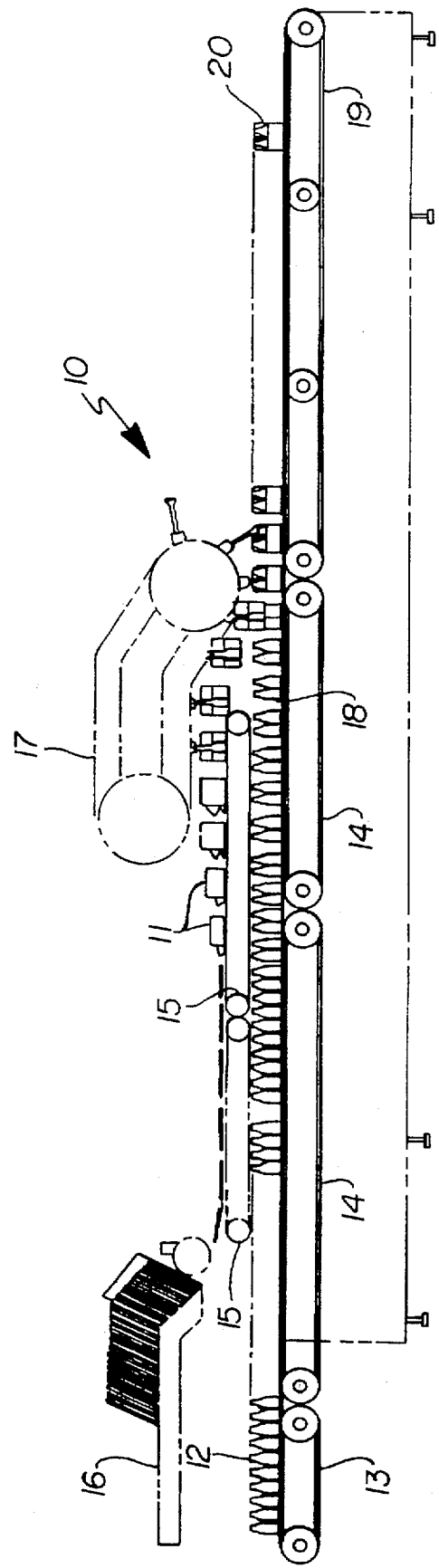
FIG. 1 is a side view of a packaging machine using a chain tensioner of the present invention.

Referring to FIG. 1, a typical packaging machine 10 has numerous conveyors for moving packaging materials such as cartons 11 and articles to be packaged such as bottles 12. An infeed conveyor 13 feeds bottles 12 into machine 10. One or more conveyors 14 moves bottles 12 through the machine where they are grouped and spaced to be joined with cartons 11. One or more conveyors 15 moves cartons 11 from a carton magazine 16 through a portion of machine 10 which erects cartons 11 and into an overhead carton carrier 17 which carries cartons 11 and places them onto grouped bottles 18. An output conveyor 19 moves the packaged articles 20 out of machine 10 to an area where they are consolidated for shipping. All of the above conveyors on machine 10 can use a chain tensioner of the present invention. The subsequent discussion of the chain tensioner of the present invention is for one embodiment of it as used on the overhead carton carrier 17, and for another embodiment used on a conveyor 14.

The functioning of overhead carton carrier 17 and the packaging machine 10 on which it is used is disclosed in U.S. Pat. No. 5,626,002 issued on May 6, 1997. Said patent being assigned to Riverwood International Corporation, the assignee of this application. The above patent is hereby incorporated by reference.

Figure 2:
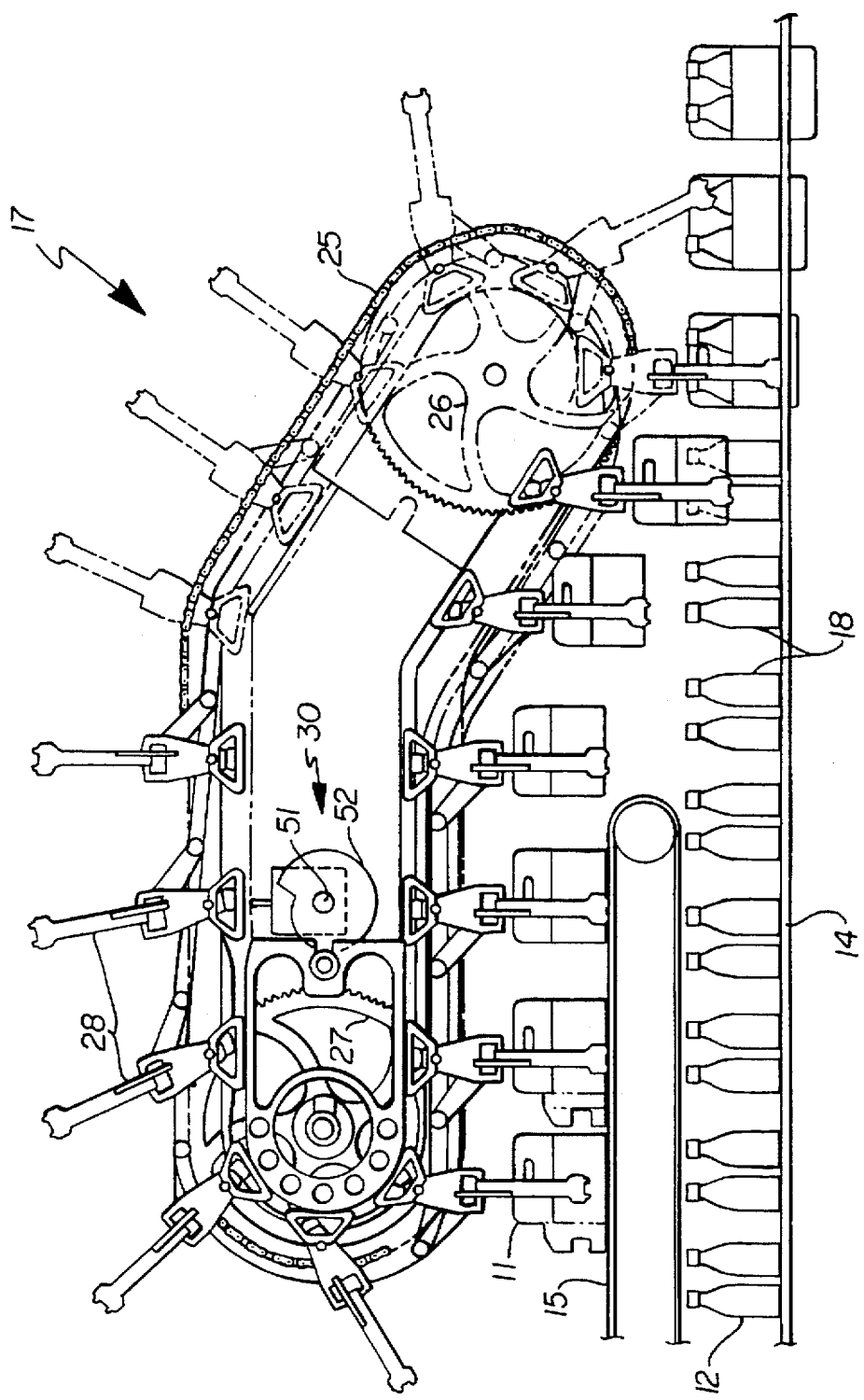
FIG. 2 is a detailed side view of area 2—2 of FIG. 1 showing the chain driven carton placing mechanism which uses an embodiment of the chain tensioner of the present invention.
Figure 3:
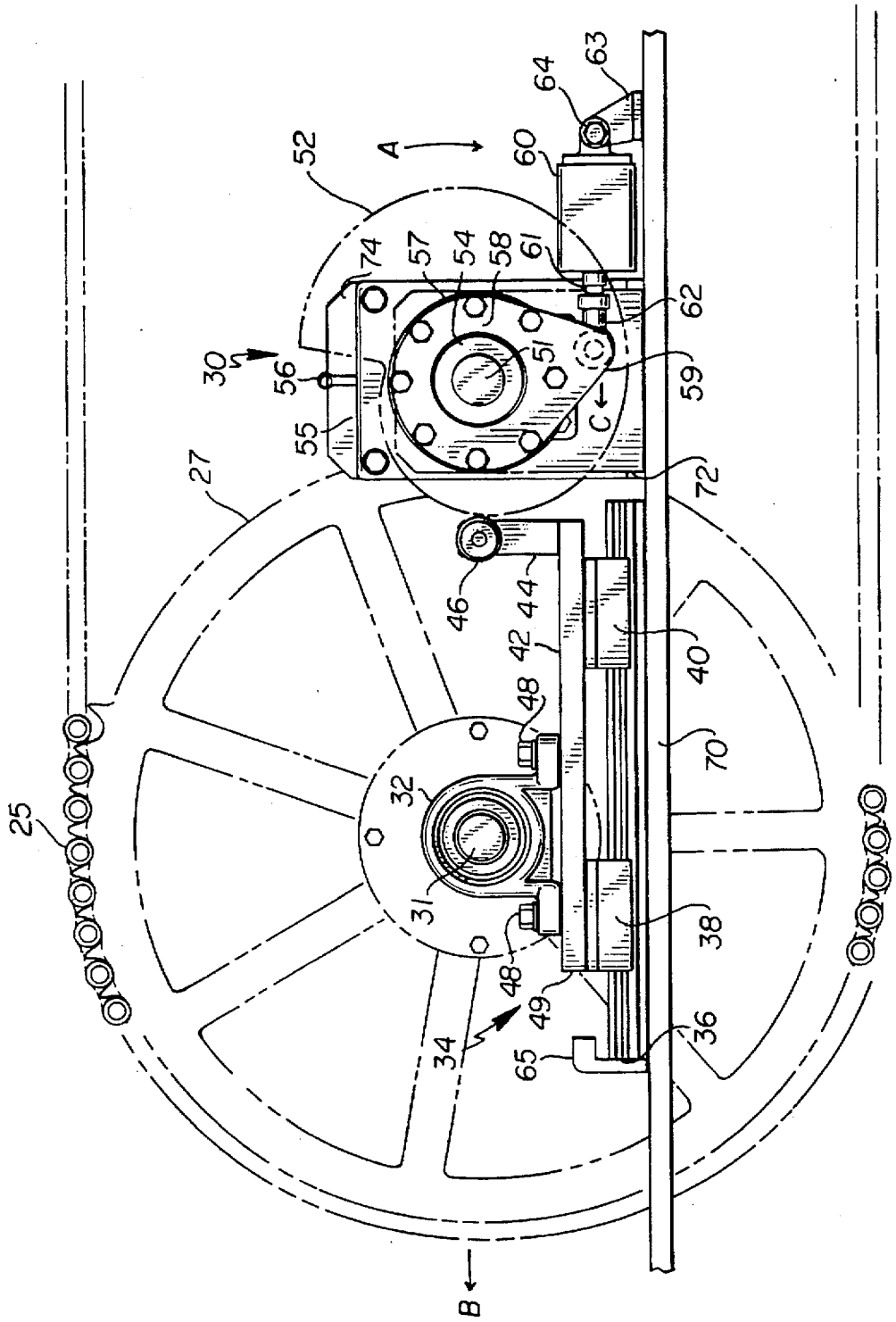
FIG. 3 is a detailed side view of the area 3—3 of FIG. 2 showing the mechanisms of an embodiment of the chain tensioner.
Figure 4:
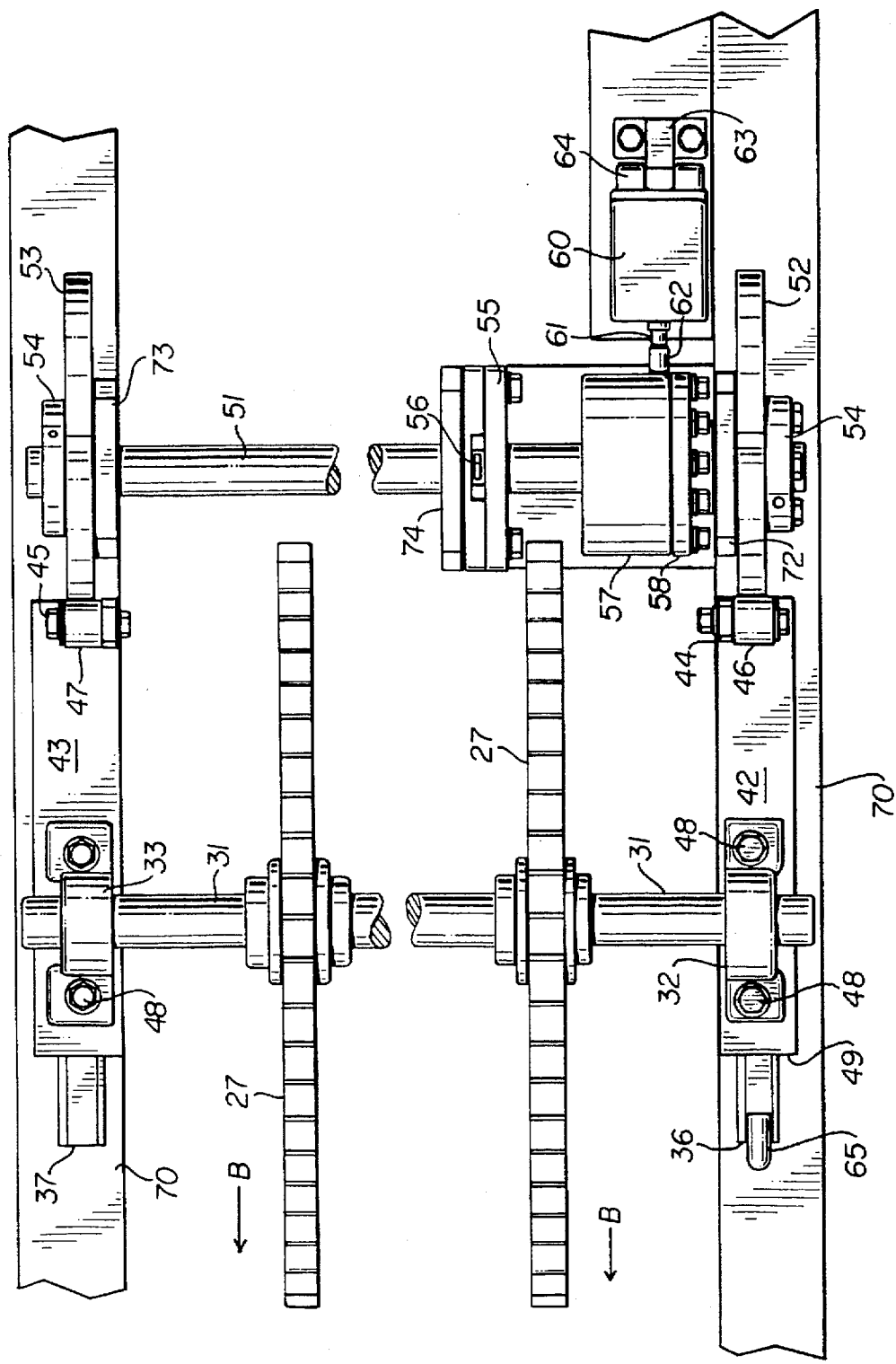
FIG. 4 is a top view of the mechanisms shown in FIG. 3.

Referring to FIGS. 2–4, an example of the preferred embodiment of the present invention is illustrated and generally indicated by the reference numeral 30. Overhead carton carrier 17 has a pair of endless chains 25 running on sprockets 26 and 27. Carton carrier assemblies 28 are attached to endless chains 25 at specific intervals along chains 25. For overhead carton carrier 17 to operate properly, proper tension in chains 25 must be maintained. If chains 25 are too loose, carrier assemblies may not be properly positioned and they may sway excessively. If chains 25 are too tight, chains 25 may wear excessively and have to be replaced too soon.

To maintain tension on chains 25, sprockets 26 and 27 are forced apart by chain tensioning mechanism 30. Sprockets 27 are supported by shaft 31 running in bearings 32 and 33 which are mounted on slide assemblies 34 and 35 attached to frame 70 of machine 10. Slide assembly 34 include linear guide rails 36 and 37 on which linear bearings 38, 39, 40 and 41 slide. Base plate 42 is attached to linear bearings 38 and 40 and base plate 43 is attached to linear bearings 39 and 41. Bearing 32 is fastened to base plate 42 and bearing 33 is fastened to base plate 43 by bolts 48. Base plates 42 and 43 have follower mount portions 44 and 45 respectively, to which followers 46 and 47 are rotatably attached. These slide assemblies 34 and 35 allow sprockets 27 to be moved linearly with respect to sprockets 26 to maintain proper tension in chains 25.

Sprockets 27 are moved linearly by means of two snail cams 52 and 53 attached to shaft 51 by collars 54. Snail cams 52 and 53 push against followers 46 and 47 respectively so that as shaft 51 rotates in the direction indicated by arrow A, the outer radius of snail cams 52 and 53 at followers 46 and 47 increases, thereby moving sprockets 27 away from shaft 51 in the direction indicated by arrow B, which increases the distance between sprockets 26 and 27 and increases tension in chains 25.

A number of mechanisms are employed to rotate shaft 51. Frame members 72 and 73 support shaft 51 which passes through and engages a ratchet box 55 having a direction selecting lever 56. Ratchet box 55 is fixedly attached to frame member 74 and direction selecting lever 56 is normally set to keep shaft 51 and snail cams 52 and 53 from rotating in a direction opposite of arrow A. A one way clutch 57 is attached to shaft 51 and a pearshaped lever arm 58 is attached to one way clutch 57. End 59 of arm 58 is connected to the piston 61 of an pneumatic cylinder 60 through rod end 62. Pneumatic cylinder 60 is pivotably attached to frame 70 through mounting bracket 63 and pivot member 64. Cylinder 60 may alternatively be a hydraulic cylinder.

Pneumatic cylinder 60 is preferably a single-acting type. As pneumatic cylinder 60 is pressurized to a predetermined amount, piston 61 extends from pneumatic cylinder 60 and pushes end 59 of arm 58 in the direction indicated by arrow C. Arm 58 and one way clutch 57 are thereby rotated in the direction indicated by arrow A. One way clutch 57 is oriented to grip shaft 51 when rotated in direction A, and freely rotate on shaft 51 when rotated in the opposite direction. Therefore, as one way clutch 57 rotates in direction A, shaft 51 and snail cams 52 and 53 also rotate in that direction to move sprockets 27 in the direction indicated by arrow B to increase tension on chains 25. If shaft 51 rotates enough for ratchet box 55 to advance at least another notch, then when pressure is released from pneumatic cylinder 60, shaft 51 and snail cams 52 and 53 will remain rotationally advanced in direction A the amount that the mechanism in ratchet box 55 advanced. Chains 25 will thereby be incrementally tensioned by ratchet increments of ratchet box 55. If shaft 51 does not rotate enough for ratchet box 55 to advance at least one notch when pneumatic cylinder 60 is pressurized to a predetermined amount, then when pressure is released from pneumatic cylinder 60, shaft 51 and snail cams 52 and 53 will rotate back to the position they were in before pneumatic cylinder 60 was pressurized, and the tension in chains 25 will remain the same as they were before pneumatic cylinder 60 was pressurized. One way clutch 57 allows linear motion of pneumatic cylinder 60 to rotationally advance shaft 51 through incremental advancement of ratchet box 55.

Figure 5:
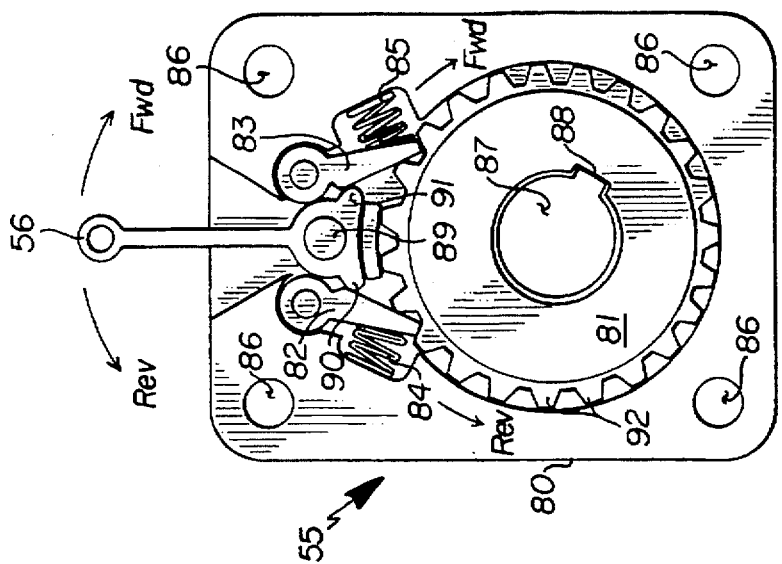
FIG. 5 is a side view of the ratchet mechanism shown in FIGS. 3 and 4.

Referring to FIG. 5, ratchet box 55 includes a housing 80, gear 81, latch levers 82 and 83, springs 84, and 85, and direction selecting lever 56. Housing 80 is attached to frame member 72 by mechanical fasteners passing through apertures 86. Gear 81 rotates within housing 80 and receives shaft 51 through aperture 87. Shaft 51 is rotationally fixed to gear 81 by a key received in keyway 88.

The position of direction selecting lever 56 determines the direction gear 81 will be allowed to turn. Direction selecting lever 56 pivots on pivot 89 and has two lobes 90 and 91 which engage latch levers 82 and 83 respectively. When direction selecting lever 56 is moved to the forward position, lobe 90 pushes latch lever 82 out of engagement with teeth 92 of gear 81 and lobe 91 allows spring 85 to push latch lever 83 into engagement with teeth 92 of gear 81. Gear 81 can then rotate in the forward direction with latch lever 83 riding over teeth 92, but if gear 81 is rotated in the reverse direction, latch lever 83 engages one of teeth 92 to prevent rotation in that direction. When direction selecting lever 56 is moved to the reverse position, lobe 91 pushes latch lever 83 out of engagement with teeth 92 of gear 81 and lobe 90 allows spring 84 to push latch lever 82 into engagement with teeth 92 of gear 81. Gear 81 can then rotate in the reverse direction with latch lever 82 riding over teeth 92, but if gear 81 is rotated in the forward direction, latch lever 83 engages one of teeth 92 to prevent rotation in that direction. When direction selecting lever is midway between forward and reverse positions as shown in FIG. 5, both latch levers 82 and 83 engage teeth 92 and gear 81 is prevented from rotating in either direction. Direction selecting lever 56 may be connected to an actuator so that direction selection can be done remotely.

The chain tensioner can be activated at the beginning of each run of a machine, by pressurizing pneumatic cylinder 60 to the predetermined amount. If chains 25 are too loose, pressurization of pneumatic cylinder 60 will advance ratchet box 55 at least one tooth 92 and increase tension in chains 25. If chain tension is adequate, pressurization of pneumatic cylinder 60 will not be enough to advance ratchet box 55 one tooth, and tension in chains 25 will remain the same. Tensioning chains is thereby a semi-automatic operation requiring a machine operator to only activate the pneumatic cylinder. The system then sets proper tension in the chain.

With a chain tensioner of the present invention, the amount of incremental increase in chain tension is determined by the pitch of snail cams 52 and 53 and the amount gear 81 needs to rotate in ratchet box 55 to advance one tooth 92. The amount of force necessary to advance ratchet box one tooth is a function of the pressure in pneumatic cylinder 60 being counteracted by the tension in chains 25. If pressure in pneumatic cylinder 60 is too high, the ratchet box 55 may be advanced at a high chain tension resulting in premature stretch and wear on chains 25 and a shortened working life. If pressure in pneumatic cylinder 60 is too low, ratchet box may not advance at a low chain tension resulting in sloppy chains. By properly setting the pressure in pneumatic cylinder 60, proper tensioning of chains 25 can be obtained.

To prevent chains 25 from being stretched beyond their useful design limit by chain tensioner 30, a sensor 65, such as an inductive proximity sensor is positioned to detect the end 49 of plate 42. The sensing range of sensor 65 is such that normally sensor 65 does not detect the presence of end 49. As chains 25 are stretched, plate 42 moves closer to sensor 65. Sensor 65 is positioned so that when chains 25 have been stretched a predetermined amount by chain tensioner 30, end 49 of plate 42 enters the sensing range of sensor 65, which then sends a signal to a machine controller to indicate that chains 25 have been stretched to their maximum, and need to be replaced. Sensor 65 may be electrically connected to a machine controller so that it activates a switch to stop machine 10 and prevent it from operating until chains 25 are replaced. Such a device prevents damage which can occur if chains 25 would fail during operation of machine 10.

The embodiment illustrated by chain tensioner 30 is for relatively large sprockets 27 and chains 25 requiring a fairly high tension. For a smaller sprocket and chain requiring smaller tension, another more compact embodiment as illustrated in FIGS. 6 and 7, is suitable.

Figure 7:
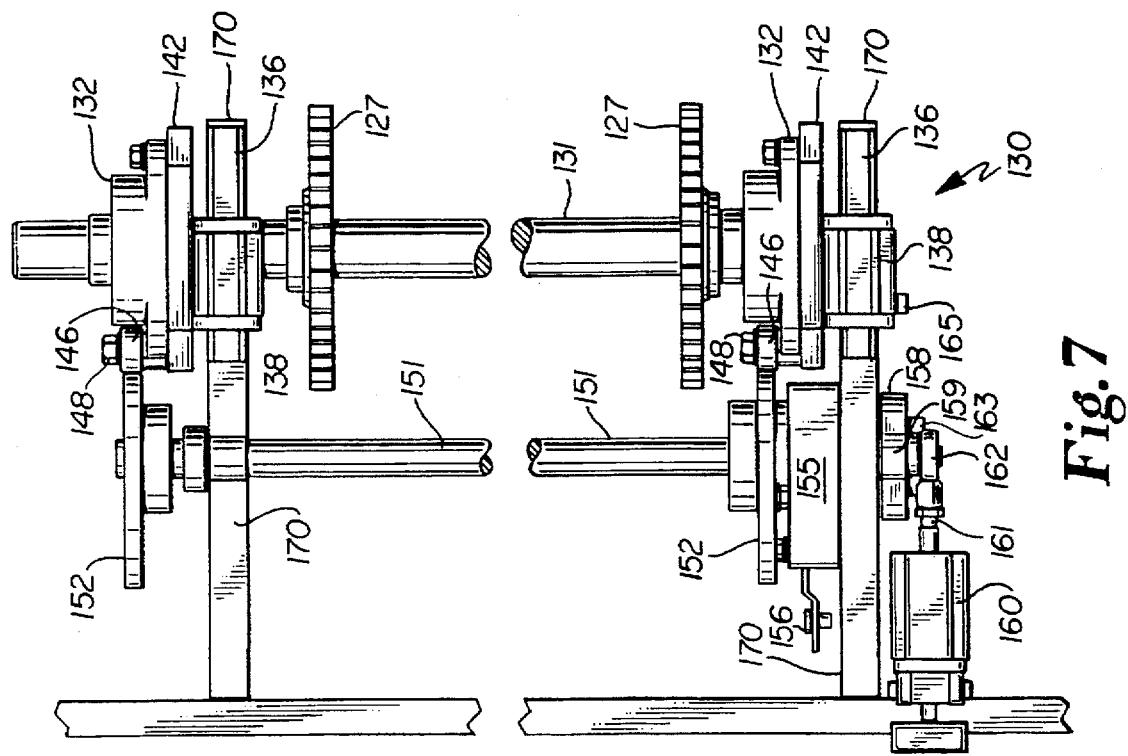
FIG. 7 is a top view of the mechanisms shown in FIG. 6.
Figure 6:
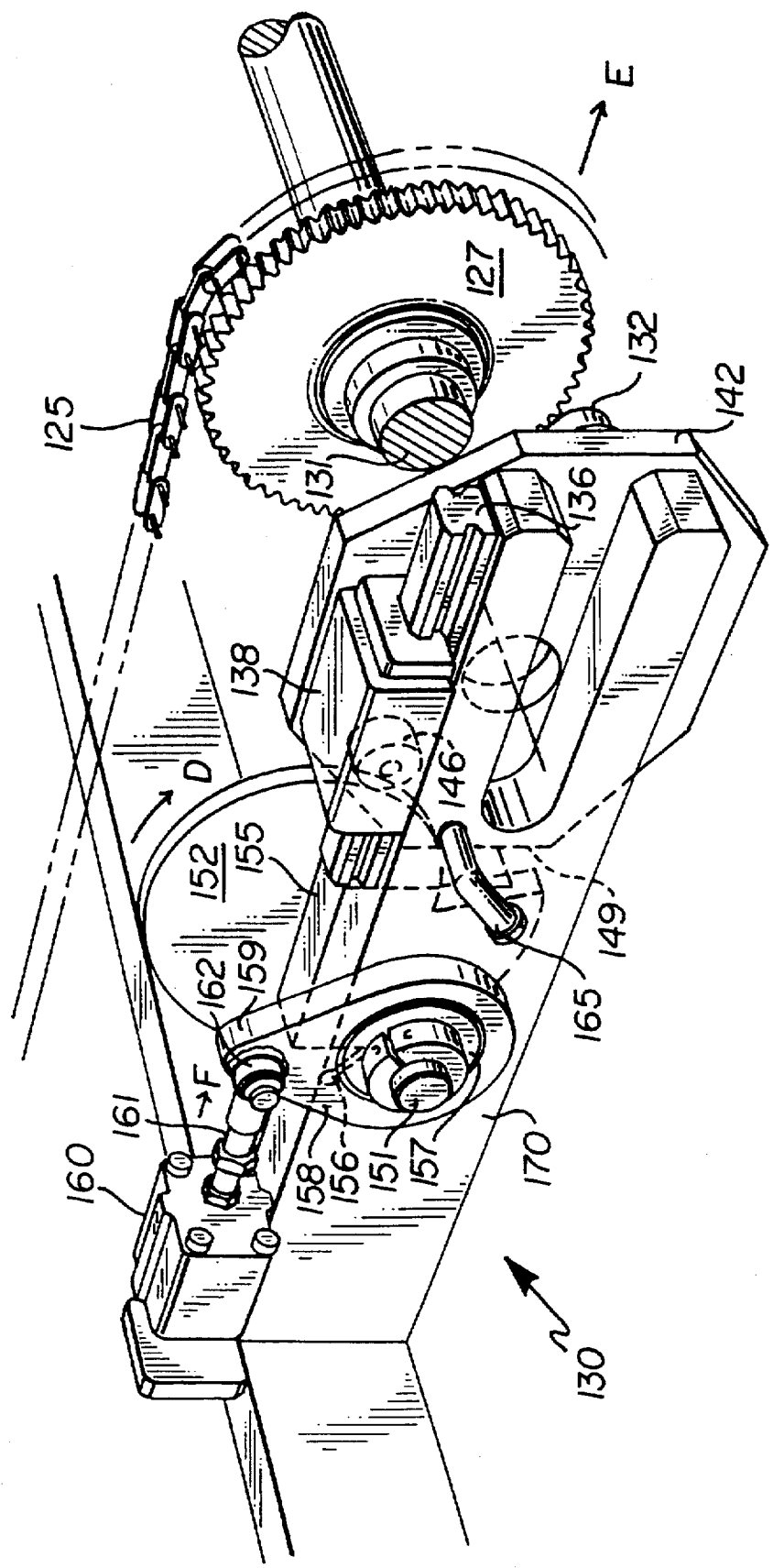
FIG. 6 is a perspective view of another embodiment of the chain tensioner of the present invention.
Figure 8:
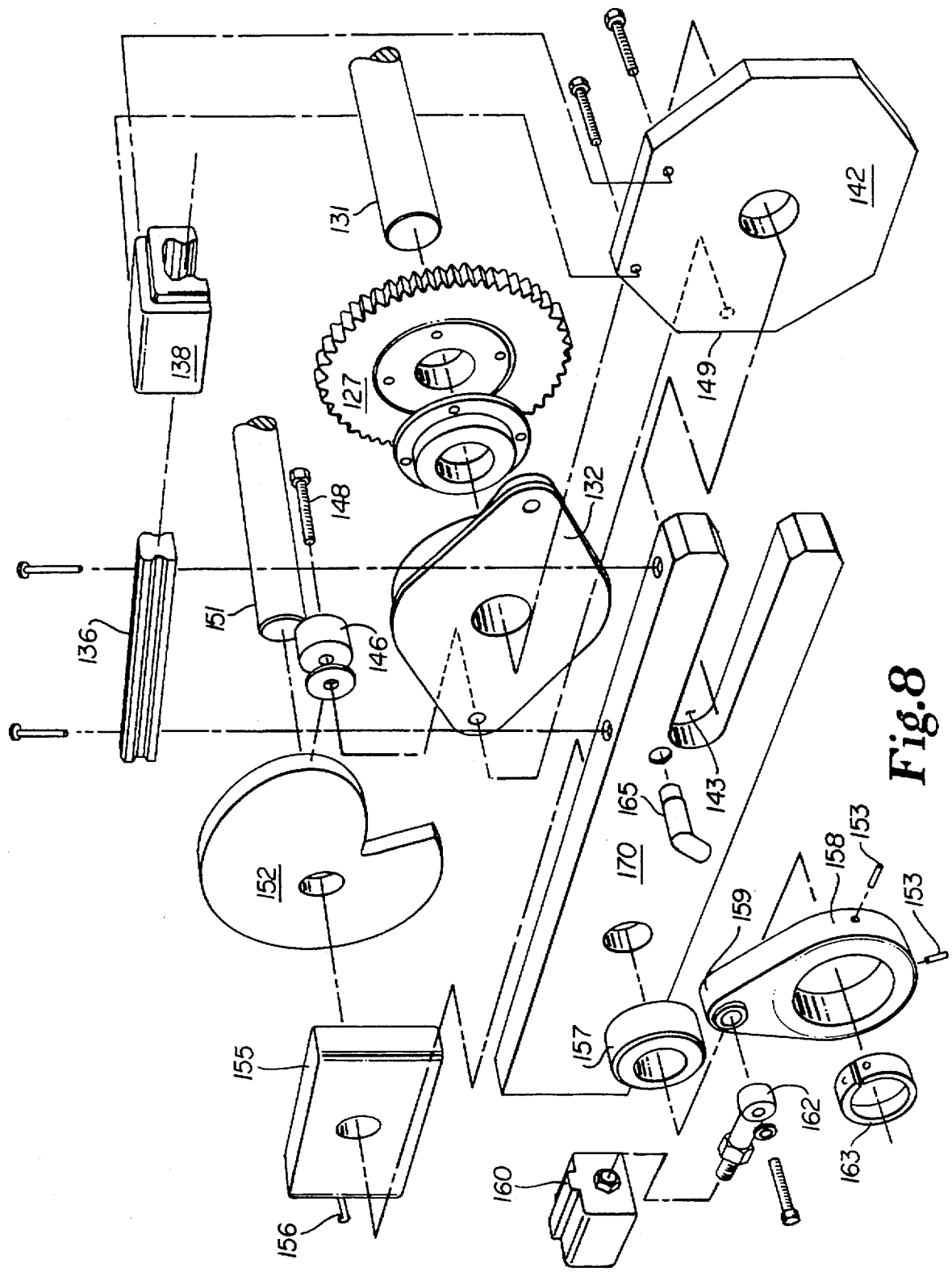
FIG. 8 is an exploded view of the mechanisms shown in FIG. 6.

Referring to FIGS. 6 and 7, chain tensioner 130 is used on a conveyor 14 of machine 10. Sprockets 127 are supported by shaft 131 running in bearings 132 attached to plates 142. The slider and cam mechanism on the opposite side of sprocket 127 is not shown, but it is identical to that shown in front of sprocket 127.

Plate 142 is attached to linear bearing 138 which slides on guide rail 136 fastened to frame member 170. Frame member 170 has a slot 143 to accommodate shaft 131 which extends beyond plate 142. Follower 146 is rotatably attached to bearing 132 and plate 142 by bolt 148. Sprocket 127 is moved linearly by means of snail cam 152 attached to shaft 151. Snail cam 152 pushes against follower 146 to move sprocket 127 away from shaft 151 in the direction indicated by arrow E as shaft 151 and snail cam 152 rotate in the direction indicated by arrow D, thereby increasing tension in chain 125.

Frame member 70 supports shaft 151 which passes through and engages a ratchet box 155. Ratchet box 155 is fixedly attached to frame member 70 and normally set to keep shaft 151 and snail cam 152 from rotating in a direction opposite of arrow D. A one way clutch 157 is attached to shaft 151 and a pear-shaped lever arm 158 is attached to one way clutch 157. In this embodiment, one way clutch 157 is small enough to fit within lever arm 158 and may be held in place by set screws 153 or other fastening means. Collar 163 attaches to shaft 151. End 159 of arm 158 is connected to the piston 161 of an pneumatic cylinder 160 through rod end 162. Pneumatic cylinder 160 is pivotably attached to frame member 170.

Operation of chain tensioner 130 is the same as that of chain tensioner 30. Pressurizing pneumatic cylinder 160 pushes end 159 of arm 158 in the direction indicated by arrow F. Arm 158 and one way clutch 157 are thereby rotated in the direction indicated by arrow D. One way clutch 157 grips shaft 51, and snail cam 152 rotates in that direction to move sprocket 127 in the direction indicated by arrow E to increase tension on chain 125. If shaft 151 rotates enough for ratchet box 155 to advance at least another notch, then when pressure is released from pneumatic cylinder 160, shaft 151 and snail cam 152 will remain rotationally advanced in direction D by the amount that the mechanism in ratchet box 155 advanced. Chain 125 will thereby be incrementally tensioned by ratchet increments of ratchet box 155. If shaft 151 does not rotate enough for ratchet box to advance at least one notch when pneumatic cylinder 160 is pressurized to a predetermined amount, then when pressure is released from pneumatic cylinder 160, shaft 151 and snail cam 52 will rotate back to the position they were in before pneumatic cylinder 160 was pressurized, and the tension in chain 125 will remain the same as it was before pneumatic cylinder 160 was pressurized.

Sensor 165, preferably an inductive proximity sensor, is mounted in frame member 170 and oriented and positioned to normally detect the presence of plate 142. When chain 125 had been stretched a predetermined amount, end 149 plate 142 will pass out of the sensing range of sensor 165, thereby causing sensor 165 to change its state, which can stop machine 10 until chain 125 has been replaced.

For a chain tensioner of the present invention, it is desirable to position the cams and followers relative to the sprockets they move so that bending in the shafts supporting the sprockets and cams is minimized. In a configuration where the sprocket support shaft is short and the bearings and slider mechanisms are sufficiently stiff, or where only one endless chain is used, it may be possible to use only one cam and follower to provide chain tension without causing excessive shaft bending. An arrangement that locates a single cam and follower near the center of a longer sprocket shaft may also be employed to provide chain tension with acceptable shaft bending.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. An apparatus for tensioning an endless drive means, comprising:
   (a) a first shaft which supports at least one endless drive means;
   (b) a support mechanism supporting said first shaft, said support mechanism being movable in a direction normal to said first shaft;
   (c) a second shaft disposed parallel to said first shaft;
   (d) a snail cam connected to said second shaft and having an outer surface with an increasing radius;
   (e) a follower connected to said support mechanism, said follower being communicatively disposed against said outer surface of said cam;
   (f) means for selectively limiting rotational direction of said second shaft; and
   (g) a means of applying a rotational force to said second shaft.

2. The apparatus of claim 1, wherein said endless drive means is a chain.

3. The apparatus of claim 2, wherein said first shaft has a sprocket supporting said chain.

4. The apparatus of claim 1, wherein said support mechanism is a slide.

5. The apparatus of claim 1, wherein said snail cam is a plate.

6. The apparatus of claim 1, wherein rotation of said second shaft is selectively limited to a direction in which said radius of said outer surface of said cam at said follower increases with rotation.

7. The apparatus of claim 1, wherein said means for selectively limiting rotational direction of said second shaft is a ratchet device.

8. The apparatus of claim 7 wherein said ratchet device has a mechanism for selecting said rotational direction of said second shaft.

9. The apparatus of claim 8, wherein said mechanism for selecting said rotational direction of said second shaft limits rotation of said second shaft in either a first direction or a second direction.

10. The apparatus of claim 8, wherein said mechanism for selecting said rotational direction of said second shaft is remotely actuated.

11. The apparatus of claim 7, wherein said ratchet device can lock said second shaft to prevent its rotation.

12. The apparatus of claim 1, wherein said means of applying a rotational force to said second shaft includes a lever arm, a one-way clutch connected to and acting between said second shaft and said lever arm, and means for moving said lever arm.

13. The apparatus of claim 12, wherein said means for moving said lever arm is a pneumatic cylinder.

14. The apparatus of claim 12, wherein said means for moving said lever arm is a hydraulic cylinder.

15. The apparatus of claim 1, wherein said rotational force is a controlled force whereby said means for selectively limiting rotational direction of said second shaft advances if tension in said at least one endless drive means is below a predetermined level, but does not advance if tension in said at least one endless drive means is above a predetermined level.

16. The apparatus of claim 1, further comprising a sensor which detects a predetermined travel limit of said support mechanism when said at least one endless drive means has been stretched a predetermined amount.

17. The apparatus of claim 16, wherein said sensor sends a signal to prevent operation of a machine on which said at least one endless drive means is used.

18. An apparatus for tensioning an endless drive means, comprising:
   (a) a frame;
   (b) at least one slide mechanism having a stationary portion attached to said frame and a moveable portion sliding on said stationary portion;
   (c) a support structure attached to said moveable portion of said slide mechanism;
   (d) a rotatable first shaft supported by said support structure on said at least one slide mechanism, said at least one slide mechanism oriented to facilitate motion of said support structure in a direction normal to said first shaft;
   (e) at least one endless drive means supported by said first shaft;
   (f) a rotatable second shaft oriented parallel to said first, said second shaft supported by said frame;
   (g) at least one snail cam attached to said second shaft, said snail cam having an outer surface with an increasing radius;
   (h) at least one follower connected to said support structure, said follower engaging said outer surface of said snail cam;
   (i) a ratchet device operating between said frame and said second shaft, said ratchet device selectively limiting rotational direction of said second shaft to a direction in which said radius of said outer surface of said cam at said follower increases with rotation of said second shaft;

(j) a lever arm rotatably attached to said second shaft;

(k) a one way clutch connected to and operating between said lever arm and said second shaft, said one way clutch allowing said lever arm to rotate in only one direction on said second shaft; and (l) means for applying a controlled force to said lever arm; whereby said means for applying a controlled force to said lever arm causes said lever arm to rotate in a direction that causes said one way clutch to engage said second shaft so that said second shaft rotates with said lever arm, thereby rotating said snail cam to thereby move said support structure in a direction that tensions said at least one drive means.

19. An apparatus for tensioning an endless chain on a machine, comprising:

(a) a frame;

(b) at least one slide mechanism having a stationary portion attached to said frame and a moveable portion sliding on said stationary portion;

(c) a sensor which detects a predetermined travel limit of said slide mechanism when said at least one chain has been stretched a predetermined amount, said sensor sending a signal to prevent operation of the machine;

(c) a support structure attached to said moveable portion of said slide mechanism;

(d) a rotatable sprocket shaft supported by said support structure on said at least one slide mechanism, said at least one slide mechanism oriented to facilitate motion of said support structure in a direction normal to said sprocket shaft;

(e) at least one sprocket attached to said sprocket shaft;

(f) at least one endless chain running on said at least one sprocket;

(g) a rotatable second shaft oriented parallel to said sprocket shaft, said second shaft supported by said frame;

(h) at least one snail cam attached to said second shaft, said snail cam having an outer surface with an increasing radius;

(i) at least one follower connected to said support structure, said follower engaging said outer surface of said snail cam;

(j) a ratchet device operating between said frame and said second shaft, said ratchet device having a mechanism for selectively limiting rotational direction of said second shaft to a direction in which said radius of said outer surface of said cam at said follower increases with rotation of said second shaft;

(k) a lever arm rotatably attached to said second shaft;

(l) a one way clutch connected to and operating between said lever arm and said second shaft, said one way clutch allowing said lever arm to rotate in only one direction on said second shaft; and (m) a pneumatic cylinder connected between said lever arm and said frame, whereby said pneumatic cylinder causes said lever arm to rotate in a direction that causes said one way clutch to engage said second shaft so that said second shaft rotates with said lever arm, thereby rotating said snail cam to thereby move said support structure with said sprocket shaft and said at least one sprocket in a direction that tensions said at least one chain.

20. An apparatus for tensioning an endless drive means, comprising:

(a) a first shaft which supports at least one endless drive means;

(b) a support mechanism supporting said first shaft, said support mechanism being movable in a direction normal to said first shaft;

(c) a second shaft disposed parallel to said first shaft;

(d) a cam connected to said second shaft;

(e) a follower connected to said support mechanism, said follower being communicatively disposed against said cam;

(f) a ratchet device for selectively limiting rotational direction of said second shaft; and (g) a means of applying a rotational force to said second shaft.

21. An apparatus for tensioning an endless drive means, comprising:

(a) a first shaft which supports at least one endless drive means, (b) a support mechanism supporting said first shaft, said support mechanism being movable in a direction normal to said first shaft;

(c) a second shaft disposed parallel to said first shaft;

(d) a cam connected to said second shaft;

(e) a follower connected to said support mechanism, said follower being communicatively disposed against said cam, (f) means for selectively limiting rotational direction of said second shaft; and (g) a means of applying a rotational force to said second shaft, said means of applying including a lever arm, a one-way clutch connected to and acting between said second shaft and said lever arm, and means for moving said lever arm.

22. An apparatus for tensioning an endless drive means, comprising:

(a) a first shaft which supports at least one endless drive means;

(b) a support mechanism supporting said first shaft, said support mechanism being movable in a direction normal to said first shaft;

(c) a second shaft disposed parallel to said first shaft;

(d) a cam connected to said second shaft;

(e) a follower connected to said support mechanism, said follower being communicatively disposed against said cam;

(f) means for selectively limiting rotational direction of said second shaft; and (g) a means of applying a rotational force to said second shaft, wherein said rotational force is a controlled force, whereby said means for selectively limiting rotational direction of said second shaft advances if tension in said at least one endless drive means is below a predetermined level, but does not advance if tension in said at least one endless drive means is above a predetermined level.

23. An apparatus for tensioning an endless drive means, comprising:

(a) a first shaft which supports at least one endless drive means;

(b) a support mechanism supporting said first shaft, said support mechanism being movable in a direction normal to said first shaft;

(c) a second shaft disposed parallel to said first shaft;

(d) a cam connected to said second shaft;

(e) a follower connected to said support mechanism, said follower being communicatively disposed against said cam;

(f) means for selectively limiting rotational direction of said second shaft;

(g) a means of applying a rotational force to said second shaft; and (h) a sensor which detects a predetermined travel limit of said support mechanism when said at least one endless drive means has been stretched a predetermined amount.

* * * * *